May 10, 1960 R. URTEL 2,936,335

METHOD AND APPARATUS FOR CONTROLLING DIRECT CURRENT COMPONENTS IN TELEVISION SIGNALS

Filed Sept. 7, 1954 3 Sheets-Sheet 1

INVENTOR

R. URTEL

INVENTOR
R. URTEL

INVENTOR
R. URTEL

United States Patent Office 2,936,335

Patented May 10, 1960

2,936,335

METHOD AND APPARATUS FOR CONTROLLING DIRECT-CURRENT COMPONENTS IN TELEVISION SIGNALS

Rudolf Urtel, deceased, late of Pforzheim, Germany, by Maria Theresia Urtel, née Distler, administratrix, Stuttgart, Germany, assignor to International Standard Electric Corporation, New York, N.Y., a corporation of Delaware Application September 7, 1954, Serial No. 454,398

Claims priority, application Germany September 8, 1953

5 Claims. (Cl. 178—7.3)

This invention relates to a method of suppressing the direct-current component in television signals.

It is a known practice that for the reproduction of a television picture there must be contained in the signal the so-called direct-current component which corresponds to the mean brightness value.

However, the transmitted combined wave comprising the direct-current component and the video signal wave may contain signal frequencies which are adjacent to the zero frequency and cause certain difficulties. In the transmission of the signal in its original frequency position, resistance-coupled amplifiers are usually employed which act upon the direct-current mean value as a high-pass filter. The result is that the adjustment of the wave to the mean value is effected by a building-up process tending to distort the wave. By means of the so-called "black-control" this building-up process is later removed from the signal. To provide for good wave transmission conditions, it is necessary that the resistance-coupled amplifier be adapted to pass low frequencies, which leads to difficulties in construction and application thereof. While these difficulties may be avoided by use of carrier frequency transmission, additional band width and complicating cable transmission then arise.

One object of this invention is to eliminate these drawbacks. According to the invention there is provided a method of suppressing the direct-current component in television signals which is characterized in that the mean value per line is determined by means of electrical integration, and a rectangular signal is produced corresponding per line to the resultant value of this integration; the signal corresponding to the mean value is then subtracted from the delayed signal having the direct-current component, the delay of the input signal being equal to the time of integration. The result of the integration is cancelled after each line, and a new integration initiated for each new line.

The subtraction may also be effected by a keyed black control, the reference voltage of which is controlled by the result of the integration. Advantageously, the delaying of the input signals is effected by means of electrical delay lines or ultra-sound delays.

The invention will be particularly described with reference to an example of an embodiment shown in the figures of the accompanying drawings.

Figs. 1A through D show typical signals which are used in explaining the mode of operation of the invention.

Figure 1:
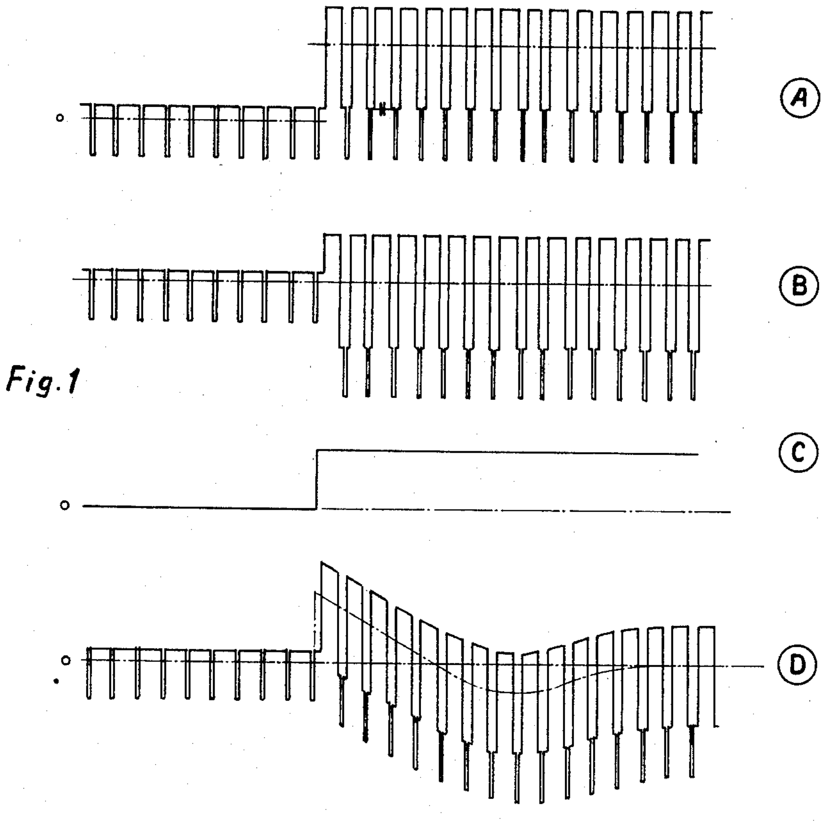

Fig. 1, line A, shows a signal consisting of a row of black and a row of white lines. This signal may be regarded as a real alternating current signal as shown at line B, to which there is added a signal, line C, the so-called direct-current component, representing the proper mean value position.

The transmission of the signal C, with the video component comprising frequencies which are in some way or other closely adjacent to zero frequency, may cause substantial difficulties especially in the two instances outlined below.

One difficulty is in the transmission of the signal in its original frequency position (so-called video signal), there are usually employed resistance-coupled amplifiers which act as a high-pass filter for the direct-current component C. The resistance-coupled amplifier builds up the mean zero value, so that there approximately results a signal D. This built-up wave is later removed from the signal by employing the so-called black control. These controls correct the instantaneous value at the end of each line, but are incapable of cancelling the sloping position or inclination of the signal within the line which is caused by the building-up process. Hence, the building-up process must proceed so slowly that the shading off, which is caused thereby, involves only a small percentage of the brightness. In this way, despite the black controls, the resistance-coupled amplifiers must pass very low frequencies with the attendant disadvantages.

Another difficulty is due to the fact that, with carrier-frequency transmission, the signal C does not permit the application of the single-sideband system, because between the carrier and the lowest modulating frequency there is no room for the flank or sloping portion of a single-sideband filter. A compromise is made by the so-called vestigial sideband system which accomplishes savings of frequency band, but demands high requirements from an eventual additional carrier set when employed for cable operation.

Fundamentally, the transmission of the signal C with the video signal is not necessary because the signal B contains the complete and necessary information, regarding the position of the mean value, in the shape of a pulse-amplitude-modulated signal (PAM). Frequencies up to half the line frequency generally do not need to be transmitted because a PAM is capable of handling modulating frequencies up to half the impulse frequency. In the present case it is evident that each impulse delivers information via the mean value of the line assigned thereto, so that black lines and white lines can follow in alternate succession (half line frequency).

The present invention is concerned with the problem of obtaining the signal B from the signal A while avoiding the building-up process of a high-pass filter, as in the signal D.

Figure 2:
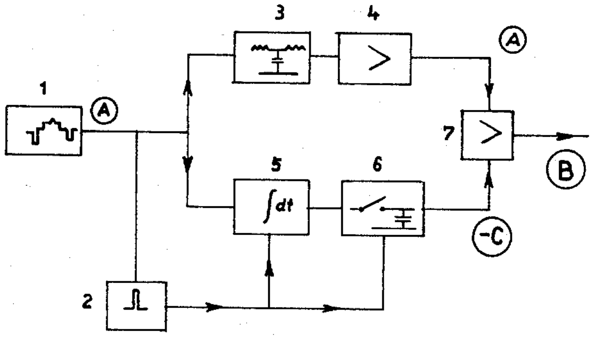
Fig. 2 shows a block diagram of an embodiment.

In Fig. 2, the reference numeral 1 denotes a source of television signals (e.g. camera or scanning device), 2 a conventional synchronizing signal separator and selector for delivering desired control impulses required later in the system. The signal is applied to two separate paths, one of which delays the signal by the duration of one line in delay device 3 and compensates for the loss of amplitude in device 3 by amplifier 4. The other path provides means for determining the mean value of the line in integrating device 5. This value is sampled at the end of each line by control pulses from 2, and is stored in a storage unit 6 which is conditioned to receive and store the sample by the same control pulse. The pulse from 2 also cancels the result of integration and the integrating circuit 5 is ready for the next line. At the output of 6, there is thus provided a stair-like or graduated signal C, having a suitable polarity with respect to the output signal A, to produce in amplifier 7 the desired signal B.

While in the usual system, a black control current serves to displace, in the signal D, the black graduations to a fixed value, so that the signal A is produced, it is possible to use a black control with a variable reference voltage, such as shown at C (Fig. 1), to obtain the signal B from signal A.

Figure 4:
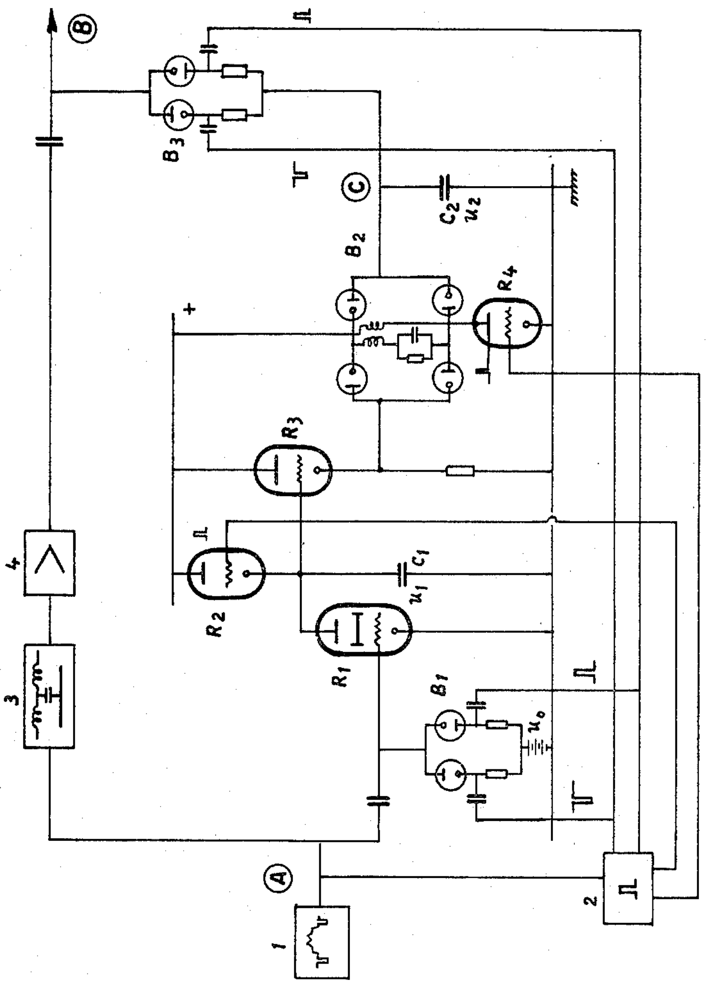
Fig. 4 shows a detailed circuit diagram of the embodiment shown by Fig. 3.
Figure 3:
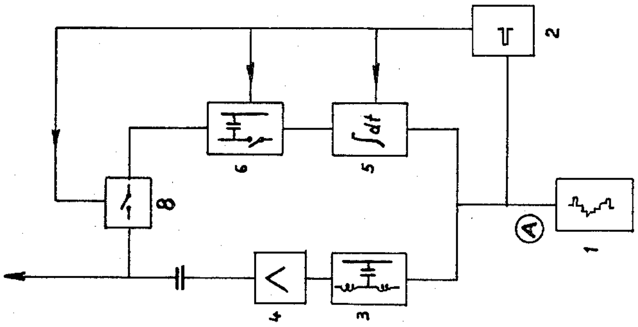
Fig. 3 shows a block diagram of another embodiment.

Such an arrangement is shown in Fig. 3 of the drawings in block schematic form. The parts which correspond to the same parts of Fig. 2 are given the same reference numerals. The stage 7 of Fig. 2 in which the algebraic addition was effected, has been replaced in this Fig. 3 by a black control circuit 8. A detailed example of a corresponding circuit diagram is shown in Fig. 4. This circuit 2 also has means to provide a suitable timing of the synchronizing pulses released on the other output leads to the grids of tubes $R_2$ and $R_4$, respectively.

Figure 5:
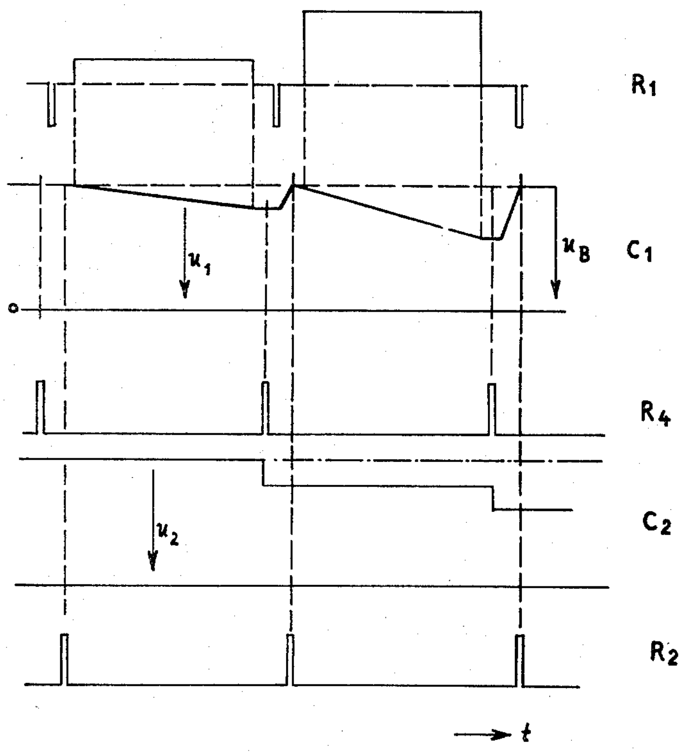
Fig. 5 shows the voltage waveform appearing at the designated places in Fig. 4.

In Fig. 4, the circuits 1, 2, 3, 4 represent the parts described hereinbefore. The separator circuit 2 has, however, two additional output leads upon which the synchronizing pulses are applied in opposite polarity and with a relative delay between them. Reference may also be had to Fig. 5 showing the wave forms appearing at specified parts of the circuit shown in Fig. 4. The signal A (Figs. 1 and 5), is applied to a tube $R_1$. Tube $R_1$, by means of a black control circuit $B_1$, keyed by pulses from 2, is maintained normally blocked by voltage $U_0$. Condenser $C_1$ is charged to the battery voltage while tube $R_1$ is blocked. In the course of one line, $C_1$ will be partially discharged by the picture signals applied to $R_1$ so that after the termination of a line the voltage at $C_1$ has dropped by an amount corresponding to the mean value of the picture signal for that line. The cathode voltage of the tube $R_2$, whose cathode circuit acts as a source of a small internal resistance for the subsequent circuit arrangement, changes in the same way. The tubes, for example, $R_2$ and $R_4$ are shown only schematically without the grid return circuits illustrated; however, such grid return circuits are conventional and are well known to those skilled in the art. Any suitable monostable multivibrator or a lumped constant low pass delay line may be used for separating in time the pulses applied to tubes $R_2$ and $R_4$. For example, reference may be had to the text book "Waveforms," Radiation Labs. Series, vol. 19, chapter 5.5.

After the termination of the integration the instantaneous voltage at $C_1$ is sampled by applying an impulse to the grid of $R_4$ which causes the operation of the diode bridge $B_2$. This bridge acts as a bipolar conductive switch interconnecting condenser $C_1$ and $C_2$, and $C_2$ being charged or discharged according to the voltage of $C_1$. Shortly thereafter, by means of an impulse applied to $R_2$, this tube is made conductive and the condenser $C_1$ will be charged again to the battery voltage and is, therewith, ready for the integration of the next succeeding line. The time-constant of the circuit for $C_2$ is long with respect to the line and the charge on $C_2$ is maintained till the next sampling. Hence, there results a voltage following the mean value of successive picture lines. The integrated signal developed across $C_2$ is applied to the keyed black control circuit $B_3$. Since the delay produced by delay circuit 3 is equal to the delay introduced by the integration circuit there will be a proper phase relation between the picture signal and the D.-C. component at the output of control circuit $B_3$. Furthermore the signal arriving at the combining point B, Fig. 4, will have no direct current component because of the condenser coupling and will be substantially in the form shown at B, Fig. 1. However, the polarity of the integrated voltage is such as to subtract from the signal voltage resulting in a waveform such as shown at A Fig. 1.

In employing a keyed black control circuit, the intermediate voltage $C_2$ may be omitted under certain circumstances and the voltage of $C_1$ may be directly applied through $B_3$ as a reference voltage.

What is claimed is:

1. In the transmission of video signals including the synchronizing pulses, the method of suppressing the direct-current component which tends to cause distortion comprising applying the video signals to two branch circuits; in one of said branch circuits sequentially integrating the varying voltage of each line of the picture of the video signal to obtain a series of voltage pulses, consecutive pulses being representative of the mean brightness of consecutive lines; delaying the video signal in the other branch circuit for a time interval equal to the transmission time of one line; passing the delayed signal through a reactive element and combining it with said series of voltage pulses whereby said tendency to cause distortion is removed.

2. The method according to claim 1 and further comprising cancelling the result of integration at the end of each line.

3. The method according to claim 1 and further comprising storing the result of said integration for the duration of one line.

4. In a system for transmitting video signals, a circuit arrangement for suppressing the direct-current component of said signals, said component tending to cause distortion in said system, comprising a source of video signals; a circuit having two branches; means for applying said video signals to said circuit, one of said branches including means for deriving a series of voltage pulses representative of the means brightness of consecutive lines of said signal; a reactive element in the second branch; means for delaying the video signal in the second branch for a time interval equal to the transmission time of one line and combining means connected to the output of said two branches whereby said tendency to cause distortion is removed from said video signal.

5. In the system according to claim 4, wherein said means for deriving said series of voltage pulses comprises an integrating circuit.

References Cited in the file of this patent

UNITED STATES PATENTS

| | | |
|---|---|---|
| 2,244,240 | Blumlein | June 3, 1941 |
| 2,307,387 | Blumlein | Jan. 5, 1943 |
| 2,546,017 | Maggio | Aug. 14, 1951 |

FOREIGN PATENTS

| | | |
|---|---|---|
| 459,853 | Great Britain | Jan. 12, 1937 |